United States Patent
Kweon et al.

(10) Patent No.: US 11,658,913 B2
(45) Date of Patent: May 23, 2023

(54) METHOD AND APPARATUS FOR REDUNDANT TRANSMISSION FOR ULTRA-RELIABLE SERVICES IN 5G WIRELESS NETWORK SYSTEM

(71) Applicant: Samsung Electronics Co., Ltd., Suwon-si (KR)

(72) Inventors: Kisuk Kweon, Suwon-si (KR); Jicheol Lee, Suwon-si (KR); Jungshin Park, Suwon-si (KR); Sangjun Moon, Suwon-si (KR); Beomsik Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 236 days.

(21) Appl. No.: 16/418,835

(22) Filed: May 21, 2019

(65) Prior Publication Data

US 2019/0356601 A1    Nov. 21, 2019

(30) Foreign Application Priority Data

May 21, 2018   (KR) .................. 10-2018-0057796

(51) Int. Cl.
*H04L 65/1069* (2022.01)
*H04L 65/1104* (2022.01)
(Continued)

(52) U.S. Cl.
CPC ............. *H04L 47/32* (2013.01); *H04L 1/08* (2013.01); *H04L 1/1628* (2013.01);
(Continued)

(58) Field of Classification Search
USPC ....................................... 370/329
See application file for complete search history.

(56) References Cited

U.S. PATENT DOCUMENTS

2015/0341830 A1    11/2015   Jeong
2018/0062779 A1    3/2018    Luo
(Continued)

FOREIGN PATENT DOCUMENTS

CN    107079371 A    8/2017
WO    2018/008980 A1    1/2018

OTHER PUBLICATIONS

"3rd Generation Partnership Project; Technical Specification Group Services and System Aspects; Procedures for the 5G System; Stage 2 (Release 15)", 3GPP TS 23.502 V15.1.0 (Mar. 2018), 285 pages.
(Continued)

*Primary Examiner* — Jeffrey M Rutkowski
*Assistant Examiner* — Luna Weissberger (57) ABSTRACT

The present disclosure relates to communication methods and systems for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Disclosed are reliable transmission methods for ultra-reliable low-latency communication (URLLC) in 5G next-generation core networks, which provide methods of redundant transmission through a plurality of transmission paths in order to perform transmission between radio access networks (RANs) through ultra-reliable transmission in the core network. The disclosure also provides simple multiple path transmission and multiple path transmission using an intermedia user plane function (I-UPF) according to the deployment environment of a network router.

18 Claims, 9 Drawing Sheets

(51) Int. Cl.
  *H04L 45/24* (2022.01)
  *H04L 47/32* (2022.01)
  *H04L 1/1812* (2023.01)
  *H04L 1/1607* (2023.01)
  *H04L 1/08* (2006.01)
  *H04L 5/00* (2006.01)
  *H04W 76/12* (2018.01)

(52) U.S. Cl.
  CPC .......... *H04L 1/1642* (2013.01); *H04L 1/1816* (2013.01); *H04L 5/0017* (2013.01); *H04L 65/1069* (2013.01); *H04L 65/1104* (2022.05); *H04W 76/12* (2018.02)

(56) References Cited

U.S. PATENT DOCUMENTS

| | | | |
|---|---|---|---|
| 2018/0097657 A1 | 4/2018 | Dao et al. | |
| 2018/0367288 A1* | 12/2018 | Vrzic | H04W 36/22 |
| 2019/0191330 A1* | 6/2019 | Dao | H04L 12/4633 |
| 2019/0253917 A1* | 8/2019 | Dao | H04M 15/8016 |
| 2019/0261260 A1* | 8/2019 | Dao | H04W 48/18 |
| 2019/0364541 A1* | 11/2019 | Ryu | H04W 76/25 |
| 2020/0178196 A1* | 6/2020 | Wang | H04W 76/16 |
| 2020/0260325 A1* | 8/2020 | Futaki | H04W 76/22 |
| 2020/0260457 A1* | 8/2020 | Sun | H04W 72/08 |
| 2020/0351969 A1* | 11/2020 | Miklos | H04W 76/15 |
| 2021/0243826 A1* | 8/2021 | Hoffmann | H04W 76/11 |

OTHER PUBLICATIONS

"3rd Generation Partnership Project; Technical Specification Group Services and System Aspects; Study on enhancement of URLLC supporting in 5GC; (Release 16)", 3GPP TR 23.725 V0.1.0 (Apr. 2018), 9 pages.

Huawei, HiSilicon, "Key issue of supporting high reliability for URLLC services", SA WG2 Meeting #127, Apr. 16-20, 2018, S2-183341, 2 pages.

Nokia, Nokia Shanghai Bell, "Updates to PDU session establishment/modification procedure", SA WG2 Meeting #125, Jan. 22-26, 2018, S2-180062, 21 pages.

International Search Report dated Aug. 29, 2019 in connection with International Patent Application No. PCT/KR2019/006084, 3 pages.

Written Opinion of the International Searching Authority dated Aug. 29, 2019 in connection with International Patent Application No. PCT/KR2019/006084, 5 pages.

Supplementary European Search Report dated Apr. 20, 2021, from the European Patent Office, in connection with European patent application No. 19806570.8, 12 pages.

Samsung, "Solution for establishing N3 and N9 tunnels for redundant transmission", SA WG2 Meeting #128, S2-186721, Jul. 2-6, 2018, Vilnius, Lithuania, 2 pages.

Huawei et al., "TS 23.502: Delay time generation for PDU session during handover", SA WG2 Meeting #122, S2-174616 (Revision of S2-17xxxx), Jun. 26-30, 2017, San Jose Del Cabo, Mexico, 11 pages.

3GPP TS 23.502, V0.3.0 (Mar. 2017), Technical Specification, 3rd Generation Partnership Project; Technical Specification Group Services and System Aspects; Procedures for the 5G System; Stage 2 (Release 15), 116 pages.

Korean Intellectual Property Office, "Office Action", dated Sep. 10, 2021, in connection with Korean Patent Application No. 10-2018-0057796, 12 pages.

3GPP TS 23.502 V0.6.0 (Aug. 2017) Technical Specification; 3rd Generation Partnership Project; Technical Specification Group Services and System Aspects; Procedures for the 5G System; Stage 2 (Release 15), 148 pages.

3GPP TS 23.501 V15.1.0 (Mar. 2018) Technical Specification; 3rd Generation Partnership Project; Technical Specification Group Services and System Aspects; System Architecture for the 5G System; Stage 2 (Release 15), 201 pages.

Office Action dated Nov. 22, 2022 in connection with Chinese Patent Application No. 201980026561.X, 11 pages.

* cited by examiner

METHOD AND APPARATUS FOR REDUNDANT TRANSMISSION FOR ULTRA-RELIABLE SERVICES IN 5G WIRELESS NETWORK SYSTEM

CROSS-REFERENCE TO RELATED APPLICATION

This application is based on and claims priority under 35 U.S.C. § 119 to Korean Patent Application No. 10-2018-0057796, filed on May 21, 2018, in the Korean Intellectual Property Office, the disclosure of which is herein incorporated by reference in its entirety.

BACKGROUND

1. Field

The disclosure relates to a 5G wireless communication network system and, more specifically, to a redundant transmission method for an ultra-reliable service.

2. Description of Related Art

The above information is presented as background information only to assist with an understanding of the disclosure. No determination has been made, and no assertion is made, as to whether any of the above might be applicable as prior art with regard to the disclosure.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

A wireless communication system defines a NextGen core (NG core), which is a new core network, as it evolves from a 4G system to a 5G system. The new core network virtualizes all existing network entities (NEs) into network functions (NFs). In addition, a mobility management entity (MME) function is separated into mobility management (MM) and session management (SM), and terminal mobility management has levels according to the usage type of terminal.

The 5G wireless communication system must support various terminals, such as enhanced mobile broadband (eMBB), ultra-reliable low-latency communications (URLLC), and massive machine type communications (mMTC). The respective terminals/services above have different requirements for the core network. The eMBB service requires a high data rate, and the URLLC service requires high stability and low latency.

Among them, the URLLC service pursues the highest service stability. That is, when data is transmitted, the data must be successfully transmitted with a reliability of 99.99% or more. To this end, there are proposals for a method of sending data through redundant transmission, thereby obtaining a high data transmission success rate, even with additional costs.

SUMMARY

The disclosure provides methods for the ultra-reliable data transmission when a user of a wireless network uses a URLLC service.

In accordance with one aspect of the disclosure, a method for operating a session management function (SMF) in a computer network system is provided. The method includes receiving a request message for establishing a protocol data unit (PDU) session, deciding to perform a redundant transmission associated with a PDU session between a user plane function (UPF) and a radio access network (RAN) node, transmitting, to the UPF, a session establishment request message, receiving, from the UPF, a session establishment response message, transmitting, to the RAN node, at least two core network (CN) tunnel information for the redundant transmission, receiving, from the RAN node, at least two access network (AN) tunnel information for the redundant transmission and transmitting, to the UPF, the at least two AN tunnel information.

In accordance with another aspect of the disclosure, a method for operating a UPF in a communication system is provided. The method includes receiving, from a session management function (SMF), a session establishment request message for a redundant transmission associated with a protocol data unit (PDU) session between the UPF and a radio access network (RAN) node, transmitting, to the SMF, a session establishment response message, receiving, from the SMF, at least two access network (AN) tunnel information, allocated by the RAN node, for the redundant transmission, wherein at least two core network (CN) tunnel information are provided to the RAN node for the redundant transmission.

In accordance with yet another aspect of the disclosure, a method for operating a RAN node in a communication system is provided. The method includes transmitting, to a session management function (SMF), a request message for establishing a protocol data unit (PDU) session, receiving, from the SMF, at least two core network (CN) tunnel information for a redundant transmission associated with a protocol data unit (PDU) session between a user plane function (UPF) and the RAN node and transmitting, to the SMF, at least two access network (AN) tunnel information for the redundant transmission, wherein the at least two AN tunnel information are transferred to the UPF.

In accordance with yet another aspect of the disclosure, an SMF is provided. The SMF includes a transceiver and a controller coupled with the transceiver and configured to receive a request message for establishing a protocol data unit (PDU) session, to decide to perform a redundant transmission associated with a PDU session between a user plane function (UPF) and a radio access network (RAN) node, to transmit, to the UPF, a session establishment request message, to receive, from the UPF, a session establishment response message, to transmit, to the RAN node, at least two core network (CN) tunnel information for the redundant transmission, to receive, from the RAN node, at least two access network (AN) tunnel information for the redundant transmission, and transmit, to the UPF, the at least two AN tunnel information.

In accordance with yet another aspect of the disclosure, a UPF is provided. The UPF includes a transceiver; and a controller coupled with the transceiver and configured to receive, from a session management function (SMF), a session establishment request message for a redundant transmission associated with a protocol data unit (PDU) session between the UPF and a radio access network (RAN) node, to transmit, to the SMF, a session establishment response message, to receive, from the SMF, at least two access network (AN) tunnel information, allocated by the RAN node, for the redundant transmission, wherein at least two core network (CN) tunnel information are provided to the RAN node for the redundant transmission.

In accordance with yet another aspect of the disclosure, a RAN node is provided. The RAN node includes a transceiver and a controller coupled with the transceiver and configured to transmit, to a session management function (SMF), a request message for establishing a protocol data unit (PDU) session, to receive, from the SMF, at least two core network (CN) tunnel information for a redundant transmission associated with a protocol data unit (PDU) session between a user plane function (UPF) and the RAN node, and to transmit, to the SMF, at least two access network (AN) tunnel information for the redundant transmission, wherein the at least two AN tunnel information are transferred to the UPF.

The embodiments according to the disclosure provides efficient communication methods. In addition, the embodiments provide communication methods for reliable services in 5G communication systems. In addition, the embodiments provides redundant transmission methods.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, an embodiment of the disclosure will be described in detail with reference to the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the terms should be defined on the basis of the contents throughout the specification.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to complete the disclosure and inform those skilled in the art of the scope of the disclosure, and the disclosure is defined only by the scope of the appended claims. Throughout the specification, the same or like reference numerals designate the same or like elements.

Hereinafter, a base station is an entity for performing resource allocation of a terminal, and may be at least one of eNode B, Node B, a base station (BS), a next-generation radio access network (NG RAN), a radio access unit, a base station controller, or a node in the network. A terminal may include user equipment (UE), next-generation UE (NG UE), a mobile station (MS), a cellular phone, a smart phone, a computer, or a multimedia system capable of performing communication functions. Although the embodiment of the disclosure will be described below on the basis of an example of a 5G system, the embodiment of the disclosure may also be applied to other communication systems with similar technical backgrounds. In addition, the embodiment of the disclosure may be modified in part by those skilled in the art without departing from the scope of the disclosure, and may be applied to other communication systems.

Figure 1:
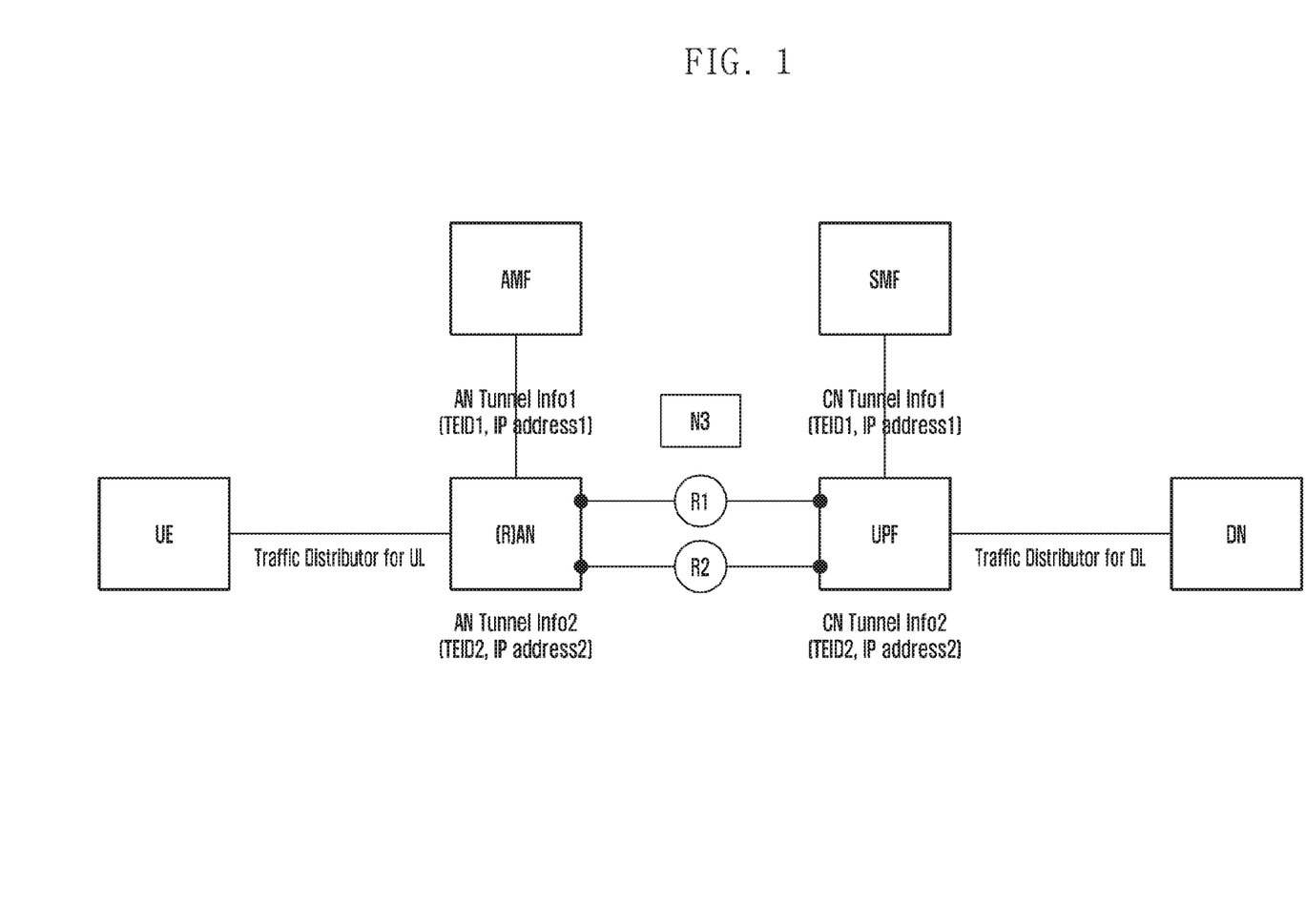
FIG. 1 illustrates exemplary transmissions through a plurality of transmission paths according to an embodiment of the disclosure.

FIG. 1 illustrates exemplary transmissions through a plurality of transmission paths according to an embodiment of the disclosure. This may be applied to the case where a network operator deploys a plurality of paths for reliable transmission between a RAN and a user plane function (UPF). It may be defined as a redundant transmission. In this case, if the UE transmits a packet data unit (PDU) session establishment request message, a session management function (SMF) determines to produce a PDU Session for a URLLC service and establishes a plurality of N3 tunnels between the RAN and the UPF for reliable transmission. To this end, the RAN transmits, to a core network (CN), two pieces of AN Tunnel Info including an IP address and a TEID. That is, the RAN transmits two IP addresses and two tunnel endpoint identifiers (TEIDs) of the RAN. The CN also transmits, to the RAN, two pieces of CN Tunnel Info including an IP address and a TEID. As a result, two N3 tunnels are established between the RAN and the UPF. In this case, the RAN becomes a traffic distributor for an uplink (UL), and the UPF becomes a traffic distributor for a downlink (DL). The traffic distributor for the DL must transmit the data received from a data network (DN) twice through two paths R1 and R2. In this case, in order for a receiving entity to distinguish between the two received packets, a transmitting entity must transmit the packets with the same GPRS tunneling protocol-user plane (GTP-U) sequence number. The receiving entity receives data from two tunnels associated with a single PDU session ID, transmits the GTP-U packet that is received first to the UE/DN, and drops the received data with the same GTP-U sequence number.

Figure 2:
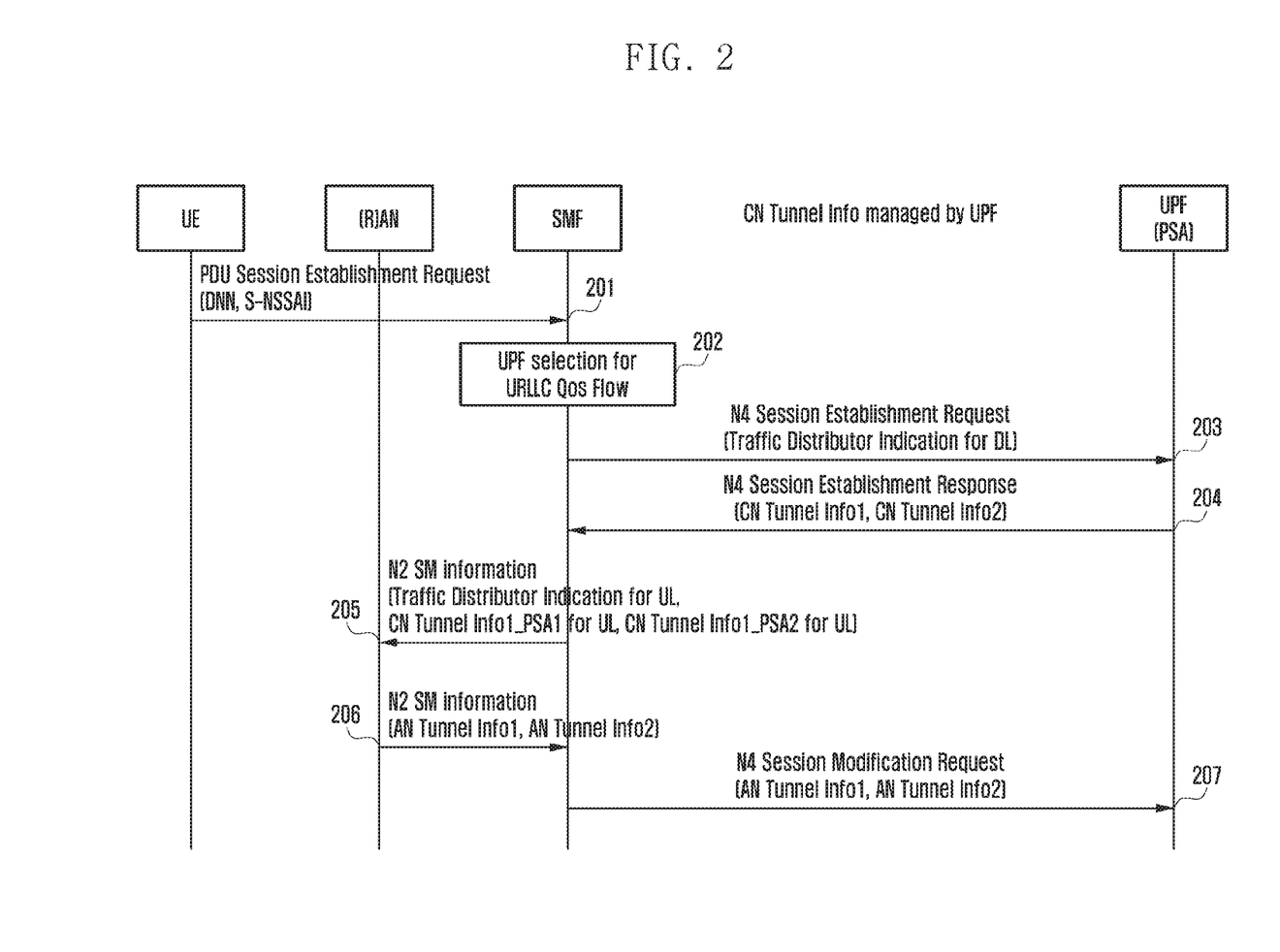
FIG. 2 illustrates an exemplary message flowchart for configuring a path for ultra-reliable transmission when producing a PDU session according to an embodiment of the disclosure.

FIG. 2 illustrates an exemplary message flowchart for configuring a path for ultra-reliable transmission when producing a PDU session according to an embodiment of the disclosure. The UE transmits a PDU session establishment request in operation 201. If the SMF that received the same determines that the PDU session requested by the UE is intended for a URLLC service, the SMF determines to configure a plurality of transmission paths in operation 202. FIG. 2 illustrates the case in which the CN Tunnel Info is allocated from the UPF. If the SMF determines a PDU session anchor (PSA), it transmits an N4 session establishment request message to the corresponding UPF in operation 203. At this time, an indication to inform that the traffic distributor is intended for URLLC path configuration is transmitted together with the same. The UPF that received the traffic distributor indication allocates two pieces of tunnel information (e.g., CN Tunnel Info1 and CN Tunnel Info2) and transmits the same to the SMF through an N4 session establishment response message in operation 204. The SMF transmits CN tunnel information to the RAN using an N2 SM information message in operation 205. In this case, the SMF also transmits traffic distributor indication to the RAN. The RAN that received the indication produces two pieces of AN tunnel information (AN Tunnel info1 and AN Tunnel info2) and transmits the same to the SMF in operation 206. The SMF transmits the same to the UPF in operation 207.

Figure 3:
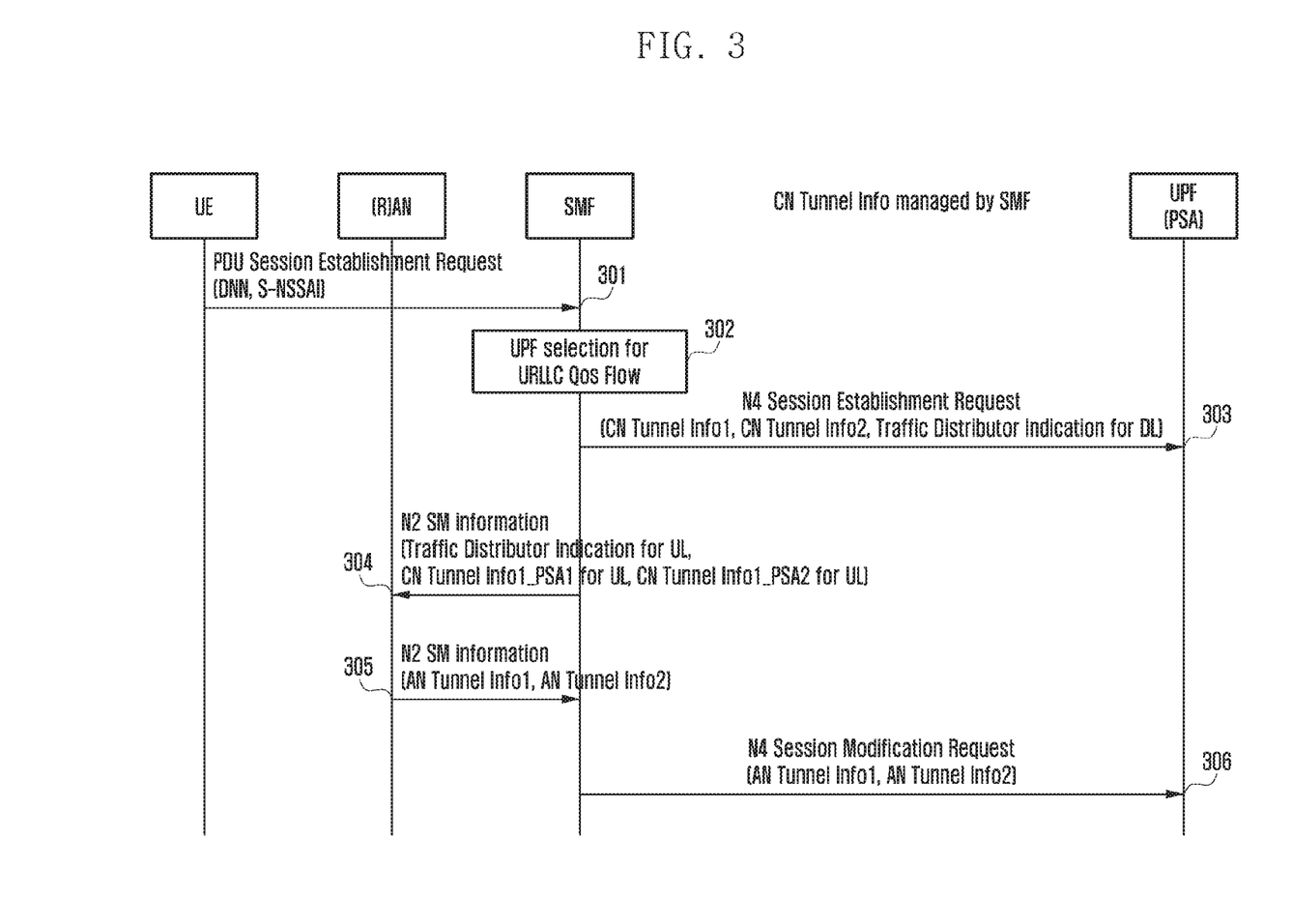
FIG. 3 illustrates an exemplary message flowchart for configuring a plurality of transmission paths and shows the case where CN Tunnel Info is configured by an SMF according to an embodiment of the disclosure.

FIG. 3 illustrates a message flowchart for configuring a plurality of transmission paths and shows the case where CN Tunnel Info is configured by the SMF according to an embodiment. The embodiment of FIG. 3 is the same as that of FIG. 2, except that CN Tunnel Info is allocated by the SMF. Therefore, the specific operations in FIG. 3 may refer to the description of FIG. 2.

Figure 4:
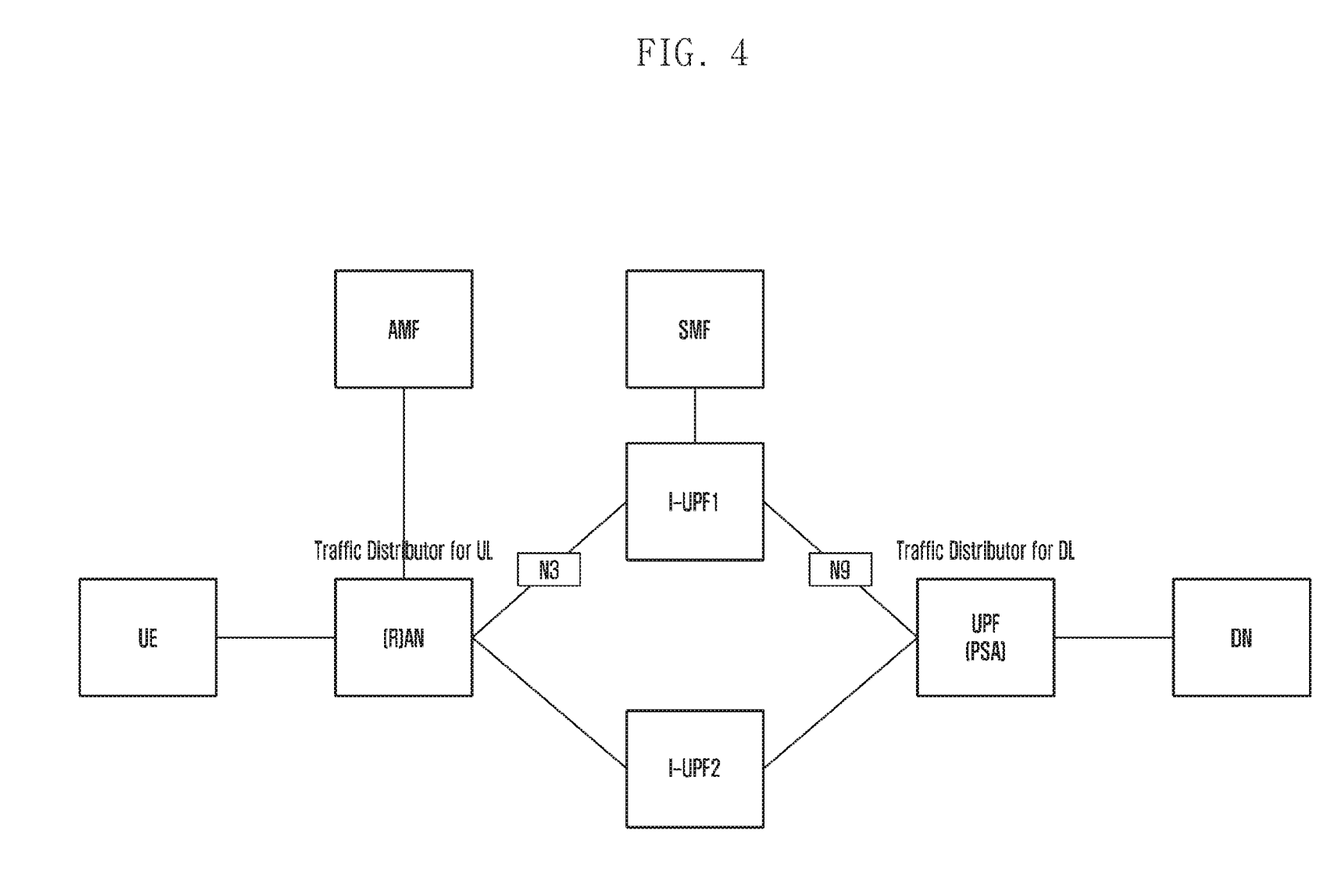
FIG. 4 illustrates exemplary transmissions through a plurality of transmission paths using an intermediate UPF (I-UPF) according to an embodiment of the disclosure.

FIG. 4 illustrates transmission through a plurality of transmission paths using an intermediate UPF (I-UPF) according to an embodiment. This is applied to the case where the network operator does not deploy a plurality of paths for reliable transmission between the RAN and the UPF. In this case, the UE transmits a PDU session establishment request message. If the session management function (SMF) determines to produce a PDU session for a URLLC service, it establishes multiple tunnels N3 and N9 between the RAN and the UPF for reliable transmission. To this end, the RAN transmits two pieces of AN Tunnel Info including an IP address and a TEID to the core network (CN). That is, the RAN transmits two IP addresses and two TEIDs of the RAN. The PSA UPF also produces two pieces of CN Tunnel Info including an IP address and a TEID. Two pieces of tunnel information produced in the RAN and the PSA UPF are allocated to I-UPF 1 and I-UPF 2, respectively, and thus two tunnels N3 and N9 are established between the RAN and the UPF. In this case, the RAN becomes a traffic distributor for the uplink (UL), and the UPF becomes a traffic distributor for the downlink (DL). The traffic distributor for the DL must transmit the data received from the data network (DN) twice through two paths I-UPF 1 and I-UPF 2. In this case, in order for the receiving entity to distinguish between the two received packets, the transmitting entity must transmit the packets with the same GPRS tunneling protocol-user plane (GTP-U) sequence number. The I-UPF must produce a GTP-U packet using the received GTP-U sequence number as it is, and must retransmit the same to the traffic distributor. The final receiving entity receives the data from two tunnels associated with a single PDU session ID, transmits the GTP-U packet that is received first to the UE/DN, and drops the received data with the same GTP-U sequence number. The above operation may be applied to the data for the UL as well.

Figure 5:
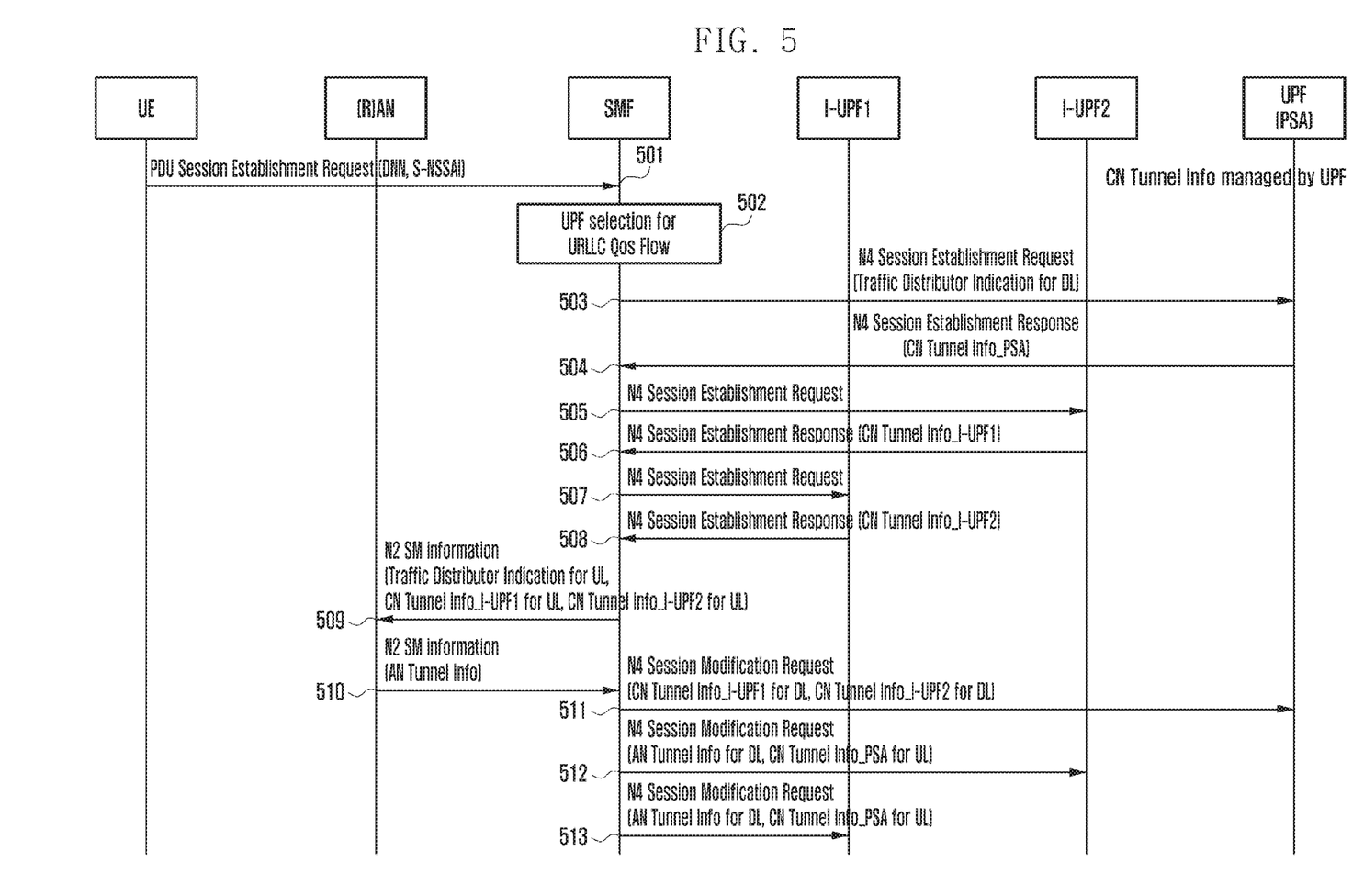
FIG. 5 illustrates an exemplary message flowchart for configuring a path for ultra-reliable transmission when producing a PDU session according to an embodiment of the disclosure.

FIG. 5 illustrates an exemplary message flowchart for configuring a path for ultra-reliable transmission when producing a PDU session according to an embodiment of the disclosure. The UE transmits a PDU session establishment request in operation 501. If the SMF that received the same determines that the PDU session requested by the UE is intended for a URLLC service, the SMF determines to configure a plurality of transmission paths in operation 502. FIG. 5 illustrates the case in which the CN Tunnel Info is allocated by the UPF. If the SMF determines a PDU session anchor (PSA), it transmits an N4 session establishment request message to the corresponding UPF in operation 503. At this time, an indication to inform that the traffic distributor is intended for URLLC path configuration is transmitted together with the same. The UPF that received the traffic distributor indication allocates two pieces of tunnel information (e.g., CN Tunnel Info1 and CN Tunnel Info2), and transmits the same to the SMF through an N4 session establishment response message in operation 504. If the SMF determines I-UPF 1 and I-UPF 2, it transmits an N4 session establishment request message to the corresponding UPF, respectively in operation 505 and operation 507. The I-UPF allocates tunnel information (e.g., CN Tunnel Info_I-UPF) and transmits the same to the SMF through an N4 session establishment response message in operation 506 and operation 508. The SMF transmits CN tunnel information of the I-UPF 1 and the I-UPF 2 to the RAN using an N2 SM information message in operation 509. At this time, a traffic distributor indication is also transmitted to the RAN. The RAN that received the indication produces two pieces of AN Tunnel information (e.g., AN Tunnel info1 and AN Tunnel info2) and transmits the same to the SMF in operation 510. The SMF transmits, to the PSA UPF, CN tunnel information of the I-UPF 1 and the I-UPF 2 for the DL through an N4 session modification request message in operation 511, and transmits, to the I-UPF 1 and the I-UPF 2, the AN tunnel information for the DL and CN tunnel_PSA information for the UL in operation 512 and operation 513.

Figure 6:
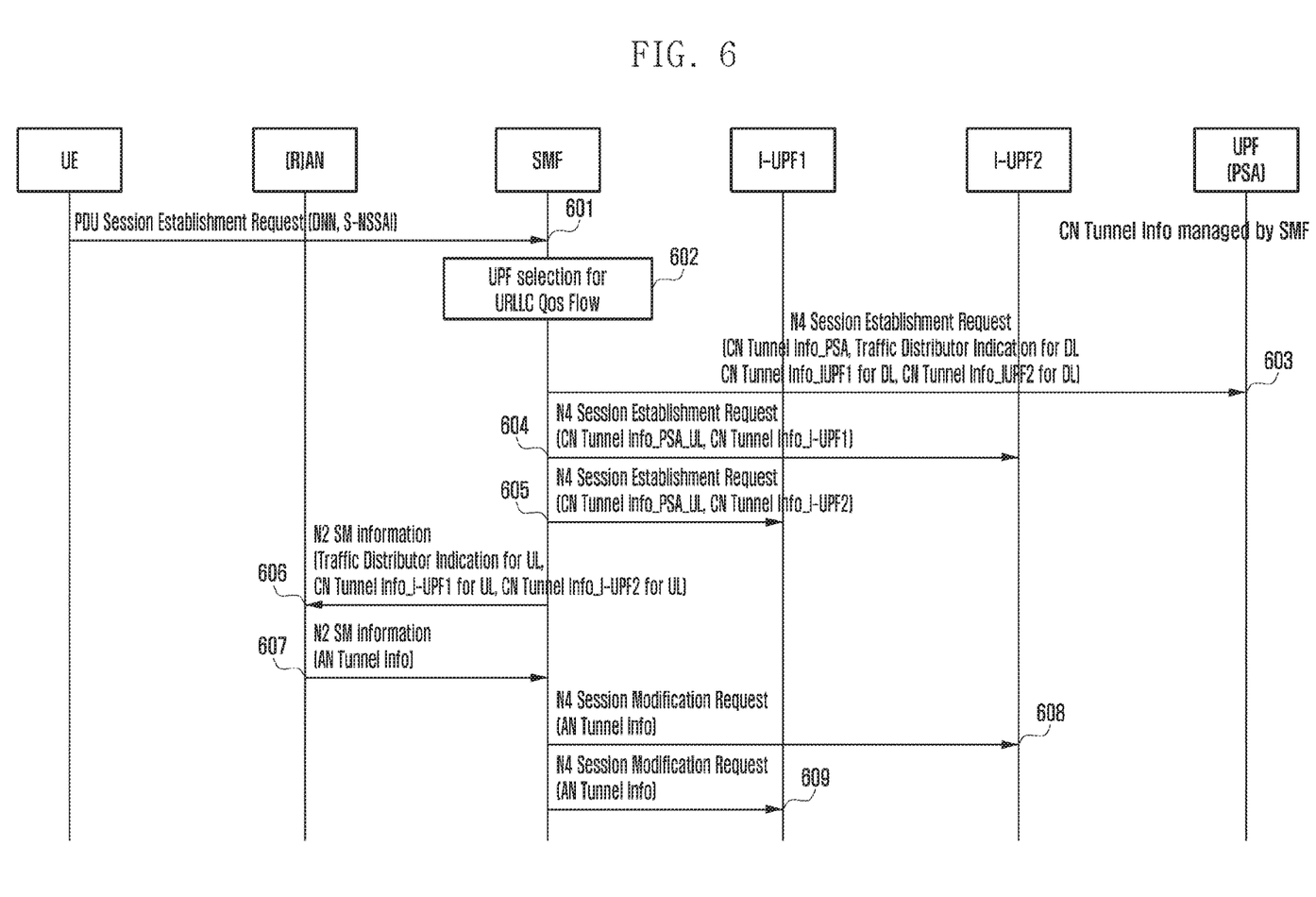
FIG. 6 illustrates an exemplary message flowchart for configuring a plurality of transmission paths using an I-UPF and shows the case where CN Tunnel Info is configured by an SMF according to an embodiment of the disclosure.

FIG. 6 illustrates a message flowchart for configuring a plurality of transmission paths using an I-UPF and shows the case where CN Tunnel Info is configured by the SMF according to an embodiment. The embodiment of FIG. 6 is the same as that of FIG. 5, except that CN Tunnel Info is allocated by the SMF. Therefore, the specific operations in FIG. 6 may refer to the embodiment in FIG. 5.

According to the embodiment, in the embodiment of configuring simple multiple transmission paths and the embodiment of configuring multiple transmission paths using the I-UPF, it is also possible to configure a primary path and a secondary path according to the network configuration, to transmit data through one path first, and if a problem occurs in the path, to transmit the data through the other path, instead of simultaneously transmitting the data through both paths. To this end, in the case of the simple multiple transmission paths, a primary path and a secondary path must be configured when the respective traffic distributors configure the tunnel information, and a primary path and a secondary path must be configured in the I-UPF when using the I-UPF. Further, a change for the configuration of the primary path and the secondary path may also be applied to the message flowchart.

Figure 7:
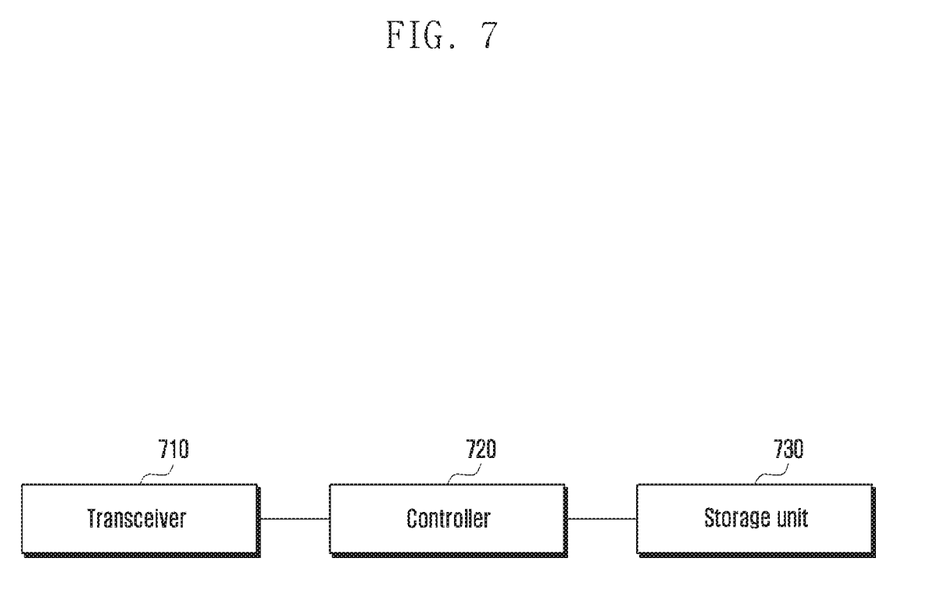
FIG. 7 illustrates the exemplary configuration of user equipment according to an embodiment of the disclosure.

FIG. 7 illustrates the high-level configuration of a user equipment according to an embodiment.

Referring to FIG. 7, the UE may include a transceiver 710, a controller 720, and a storage unit 730. In the embodiment, the controller 720 may include circuits, application-specific integrated circuits, software, firm ware, and/or at least one processor.

The transceiver 710 may transmit/receive signals to/from other network entities. The controller 720 may control overall operations of the UE according to the embodiment proposed in the disclosure. The storage unit 730 may store at least one piece of information transmitted/received through the transceiver 710 and information produced through the controller 720.

Figure 8:
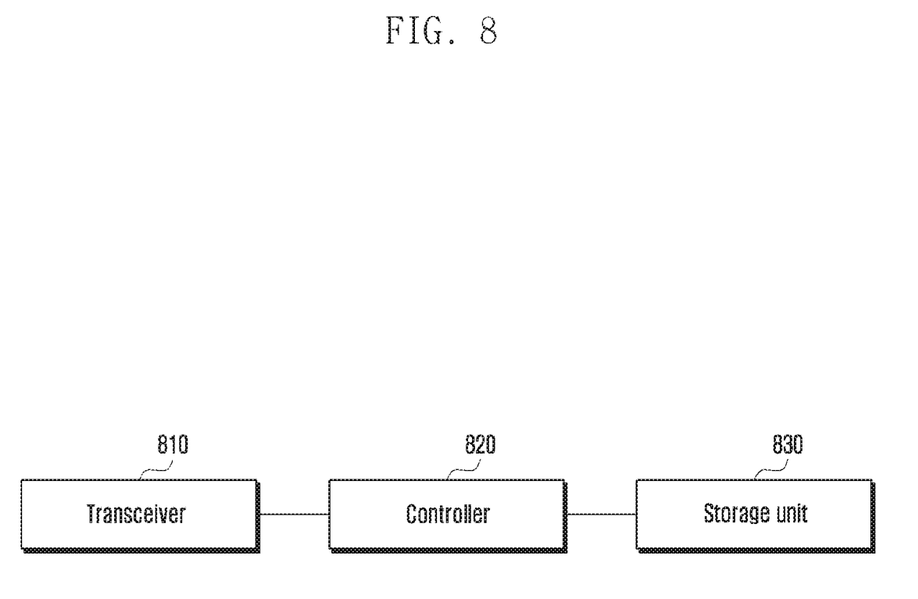
FIG. 8 illustrates the exemplary configuration of a base station according to an embodiment of the disclosure.

FIG. 8 illustrates the high-level configuration of a base station according to an embodiment of the disclosure. The base station may correspond to the RAN node in the respective embodiments.

Referring to FIG. 8, the base station may include a transceiver 810, a controller 820, and a storage unit 830. In the embodiment, the controller 820 may include circuits, application-specific integrated circuits, software, firm ware, and/or at least one processor.

The transceiver 810 may transmit/receive signals to/from other network entities. The controller 820 may control overall operations of the base station according to the embodiment proposed in the disclosure. The storage unit 830 may store at least one piece of information transmitted/received through the transceiver 810 and information produced through the controller 820.

Figure 9:
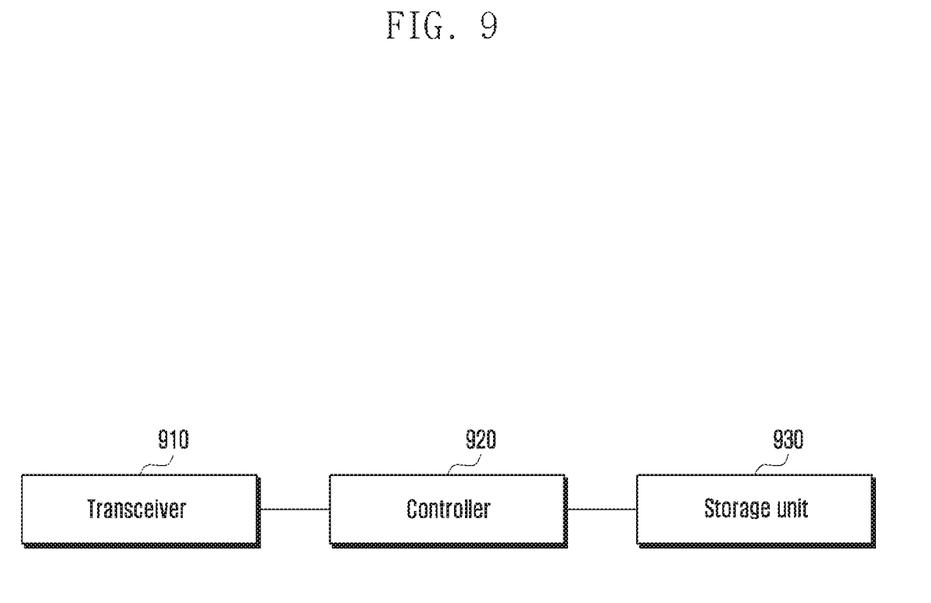
FIG. 9 illustrates the exemplary configuration of a higher node according to an embodiment of the disclosure.

FIG. 9 illustrates a high-level configuration of higher nodes or network entities according to an embodiment of the disclosure. The higher nodes may be at least one of the AMF, the SMF, the I-UPF, the UPF, and the DN according to the respective embodiments. That is, the device configuration in FIG. 9 may be applied to the configuration of network entities, such as the AMF, the SMF, the I-UPF, the UPF, and the DN.

Referring to FIG. 9, the higher nodes may include a transceiver 910, a controller 920, and a storage unit 930. In the embodiment, the controller 920 may include circuits, application-specific integrated circuits, software, firm ware, and/or at least one processor.

The transceiver 910 may transmit/receive signals to/from other network entities. The controller 920 may control overall operations of the higher node according to the embodiment proposed in the disclosure. The storage unit 930 may store at least one piece of information transmitted/received through the transceiver 910 and information produced through the controller 920.

The embodiments disclosed in the specifications and drawings are provided merely to readily describe and to help a thorough understanding of the disclosure but are not intended to limit the scope of the disclosure. Therefore, it should be construed that, in addition to the embodiments disclosed herein, all modifications and changes or modified and changed forms derived from the technical idea of the disclosure fall within the scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a session management function (SMF) in a communication system, the method comprising:
    receiving a request message for establishing a protocol data unit (PDU) session;
    deciding to perform a redundant transmission associated with the PDU session between a user plane function (UPF) and a single radio access network (RAN) node;
    transmitting, to the UPF, a session establishment request message;
    receiving, from the UPF, a session establishment response message;
    transmitting, to the RAN, at least two core network (CN) tunnel information for establishing at least two CN tunnels between the single RAN node and the UPF for the redundant transmission;
    receiving, from the single RAN node, at least two access network (AN) tunnel information for the redundant transmission; and
    transmitting, to the UPF, the at least two AN tunnel information,
    wherein the session establishment request message includes the at least two CN tunnel information in case that the at least two CN tunnel information are allocated by the SMF, and
    wherein the session establishment response message includes the at least two CN tunnel information in case that the at least two CN tunnel information are allocated by the UPF.

2. The method of claim 1, wherein a packet and a duplicated packet corresponding to the packet are assigned with a same sequence number and are transmitted via at least two tunnels, based on at least one of the at least two CN tunnel information or at least two AN tunnel information, separately, and wherein in case that the single RAN node or the UPF receives the packet and the duplicated packet, one of the packet and the duplicated packet is eliminated based on the same sequence number.

3. The method of claim 1, further comprising:
    deciding whether to insert two intermediate UPFs (I-UPFs) between the UPF and the single RAN node for the redundant transmission,
    wherein in case that CN tunnel information of the UPF is allocated by the UPF, downlink CN tunnel information of the two I-UPFs is provided to the UPF and the CN tunnel information of the UPF is provided to the SMF, and uplink CN tunnel information of the UPF is provided to the two I-UPFs,
    wherein in case that the CN tunnel information of the two I-UPFs and the CN tunnel information of the UPF are allocated by the SMF, the CN tunnel information of the two I-UPFs are provided to the UPF and the CN tunnel information of the UPF is provided to the two I-UPFs, and
    wherein the CN tunnel information of the two I-UPFs and the CN tunnel information of the UPF are provided to the single RAN node.

4. A method performed by a user plane function (UPF) in a communication system, the method comprising:
    receiving, from a session management function (SMF), a session establishment request message for a redundant transmission associated with a protocol data unit (PDU) session between the UPF and a single radio access network (RAN) node;
    transmitting, to the SMF, a session establishment response message; and
    receiving, from the SMF, at least two access network (AN) tunnel information, allocated by the single RAN node, for the redundant transmission,
    wherein at least two core network (CN) tunnel information for establishing at least two CN tunnels between the single RAN node and the UPF are provided to the single RAN node for the redundant transmission,
    wherein the session establishment request message includes the at least two CN tunnel information in case that the at least two CN tunnel information are allocated by the SMF, and
    wherein the session establishment response message includes the at least two CN tunnel information in case that the at least two CN tunnel information are allocated by the UPF.

5. The method of claim 4, wherein a packet and a duplicated packet corresponding to the packet are assigned with a same sequence number and transmitted via at least two tunnels, based on at least one of the at least two CN tunnel information or at least two AN tunnel information, separately, and wherein in case that the single RAN node or the UPF receives the packet and the duplicated packet, one of the packet and the duplicated packet is eliminated based on the same sequence number.

6. The method of claim 4,
    wherein inserting two I-UPFs between the UPF and the single RAN node for the redundant transmission is decided,
    wherein in case that CN tunnel information of the UPF is allocated by the UPF, downlink CN tunnel information of the two I-UPFs is provided to the UPF and the CN tunnel information of the UPF is provided to the SMF, and uplink CN tunnel information of the UPF is provided to the two I-UPFs,
    wherein in case that the CN tunnel information of the two I-UPFs and the CN tunnel information of the UPF are allocated by the SMF, the CN tunnel information of the two I-UPFs are provided to the UPF and the CN tunnel information of the UPF is provided to the two I-UPFs, and wherein the CN tunnel information of the two I-UPFs and the CN tunnel information of the UPF are provided to the single RAN node.

7. A method performed by a single radio access network (RAN) node in a communication system, the method comprising:
    transmitting, to a session management function (SMF), a request message for establishing a protocol data unit (PDU) session;
    receiving, from the SMF, at least two core network (CN) tunnel information for establishing at least two CN tunnels between the single RAN node and a user plane function (UPF) for a redundant transmission associated with the PDU session between the UPF and the single RAN node; and
    transmitting, to the SMF, at least two access network (AN) tunnel information for the redundant transmission,
    wherein the at least two AN tunnel information are transferred to the UPF, wherein a session establishment request message includes the at least two CN tunnel information in case that the at least two CN tunnel information are allocated by the SMF, and
    wherein a session establishment response message includes the at least two CN tunnel information in case that the at least two CN tunnel information are allocated by the UPF.

8. The method of claim 7, wherein a packet and a duplicated packet corresponding to the packet are assigned with a same sequence number and transmitted via at least two tunnels, based on at least one of the at least two CN tunnel information or at least two AN tunnel information, separately, and wherein in case that the single RAN node or the UPF receives the packet and the duplicated packet, one of the packet and the duplicated packet is eliminated based on the same sequence number.

9. The method of claim 7,
    wherein inserting two I-UPFs between the UPF and the single RAN node for the redundant transmission is decided,
    wherein in case that CN tunnel information of the UPF is allocated by the UPF, downlink CN tunnel information of the two I-UPFs is provided to the UPF and the CN tunnel information of the UPF is provided to the SMF, and uplink CN tunnel information of the UPF is provided to the two I-UPFs,
    wherein in case that the CN tunnel information of the two I-UPFs and the CN tunnel information of the UPF are allocated by the SMF, the CN tunnel information of the two I-UPFs are provided to the UPF and the CN tunnel information of the UPF is provided to the two I-UPFs, and
    wherein the CN tunnel information of the two I-UPFs and the CN tunnel information of the UPF are provided to the single RAN node.

10. An apparatus for a session management function (SMF) in a communication system, the apparatus comprising:
    a transceiver; and
    a controller coupled with the transceiver and configured to:
        receive a request message for establishing a protocol data unit (PDU) session,
        decide to perform a redundant transmission associated with the PDU session between a user plane function (UPF) and a single radio access network (RAN) node,
        transmit, to the UPF, a session establishment request message,
        receive, from the UPF, a session establishment response message,
        transmit, to the single RAN node, at least two core network (CN) tunnel information for establishing at least two CN tunnels between the single RAN node and a user plane function (UPF) for the redundant transmission,
        receive, from the single RAN node, at least two access network (AN) tunnel information for the redundant transmission, and
        transmit, to the UPF, the at least two AN tunnel information,
    wherein the session establishment request message includes the at least two CN tunnel information in case that the at least two CN tunnel information are allocated by the SMF, and
    wherein the session establishment response message includes the at least two CN tunnel information in case that the at least two CN tunnel information are allocated by the UPF.

11. The apparatus of claim 10, wherein a packet and a duplicated packet corresponding to the packet are assigned with a same sequence number and transmitted via at least two tunnels, based on at least one of the at least two CN tunnel information or at least two AN tunnel information, separately, and wherein in case that the single RAN node or the UPF receives the packet and the duplicated packet, one of the packet and the duplicated packet is eliminated based on the same sequence number.

12. The apparatus of claim 10,
    wherein the controller is further configured to decide to insert two I-UPFs between the UPF and the single RAN node for the redundant transmission,
    wherein in case that CN tunnel information of the UPF is allocated by the UPF, downlink CN tunnel information of the two I-UPFs is provided to the UPF and the CN tunnel information of the UPF is provided to the SMF, and uplink CN tunnel information of the UPF is provided to the two I-UPFs,
    wherein in case that the CN tunnel information of the two I-UPFs and the CN tunnel information of the UPF are allocated by the SMF, the CN tunnel information of the two I-UPFs are provided to the UPF and the CN tunnel information of the UPF is provided to the two I-UPFs, and
    wherein the CN tunnel information of the two I-UPFs and the CN tunnel information of the UPF are provided to the single RAN node.

13. An apparatus of a user plane function (UPF) in a communication system, the apparatus comprising:
    a transceiver; and
    a controller coupled with the transceiver and configured to:
        receive, from a session management function (SMF), a session establishment request message for a redundant transmission associated with a protocol data unit (PDU) session between the UPF and a single radio access network (RAN) node,
        transmit, to the SMF, a session establishment response message,
        receive, from the SMF, at least two access network (AN) tunnel information, allocated by the single RAN node, for the redundant transmission,
    wherein at least two core network (CN) tunnel information for establishing at least two CN tunnels between the single RAN node and a user plane function (UPF) for the redundant transmission are provided to the single RAN node, wherein the session establishment request message includes the at least two CN tunnel information in case that the at least two CN tunnel information are allocated by the SMF, and wherein the session establishment response message includes the at least two CN tunnel information in case that the at least two CN tunnel information are allocated by the UPF.

14. The apparatus of claim 13, wherein a packet and a duplicated packet corresponding to the packet are assigned with a same sequence number and transmitted via at least two tunnels, based on at least one of the at least two CN tunnel information or at least two AN tunnel information, separately, and wherein in case that the single RAN node or the UPF receives the packet and the duplicated packet, one of the packet and the duplicated packet is eliminated based on the same sequence number.

15. The apparatus of claim 13, wherein inserting two I-UPFs between the UPF and the single RAN node for the redundant transmission is decided, wherein in case that CN tunnel information of the UPF is allocated by the UPF, downlink CN tunnel information of the two I-UPFs is provided to the UPF and the CN tunnel information of the UPF is provided to the SMF, and uplink CN tunnel information of the UPF is provided to the two I-UPFs, wherein in case that the CN tunnel information of the two I-UPFs and the CN tunnel information of the UPF are allocated by the SMF, the CN tunnel information of the two I-UPFs are provided to the UPF and the CN tunnel information of the UPF is provided to the two I-UPFs, and wherein the CN tunnel information of the two I-UPFs and the CN tunnel information of the UPF are provided to the single RAN node.

16. A single radio access network (RAN) node in a communication system, the single RAN node comprising:

a transceiver; and a controller coupled with the transceiver and configured to:

transmit, to a session management function (SMF), a request message for establishing a protocol data unit (PDU) session, receive, from the SMF, at least two core network (CN) tunnel information for establishing at least two CN tunnels between the single RAN node and a user plane function (UPF) for a redundant transmission associated with the PDU session between the single RAN node and the UPF, and transmit, to the SMF, at least two access network (AN) tunnel information for the redundant transmission, wherein the at least two AN tunnel information are transferred to the UPF, wherein a session establishment request message includes the at least two CN tunnel information in case that the at least two CN tunnel information are allocated by the SMF, and wherein a session establishment response message includes the at least two CN tunnel information in case that the at least two CN tunnel information are allocated by the UPF.

17. The single RAN node of claim 16, wherein a packet and a duplicated packet corresponding to the packet are assigned with a same sequence number and transmitted via at least two tunnels, based on at least one of the at least two CN tunnel information or at least two AN tunnel information, separately, and wherein in case that the single RAN node or the UPF receives the packet and the duplicated packet, one of the packet and the duplicated packet is eliminated based on the same sequence number.

18. The single RAN node of claim 16, wherein inserting two I-UPFs between the UPF and the single RAN node for the redundant transmission is decided, wherein in case that CN tunnel information of the UPF is allocated by the UPF, downlink CN tunnel information of the two I-UPFs is provided to the UPF and the CN tunnel information of the UPF is provided to the SMF, and uplink CN tunnel information of the UPF is provided to the two I-UPFs, wherein in case that the CN tunnel information of the two I-UPFs and the CN tunnel information of the UPF are allocated by the SMF, the CN tunnel information of the two I-UPFs are provided to the UPF and the CN tunnel information of the UPF is provided to the two I-UPFs, and wherein the CN tunnel information of the two I-UPFs and the CN tunnel information of the UPF are provided to the single RAN node.

* * * * *